United States Patent
Cortes et al.

(10) Patent No.: US 8,320,916 B2
(45) Date of Patent: Nov. 27, 2012

(54) METHOD AND APPARATUS FOR PRE-FETCHING DATA IN A MOBILE NETWORK ENVIRONMENT USING EDGE DATA STORAGE

(75) Inventors: Mauricio Cortes, Scotch Plains, NJ (US); James William McGowan, Flemington, NJ (US)

(73) Assignee: Alcatel Lucent, Paris (FR)

( * ) Notice: Subject to any disclaimer, the term of this patent is extended or adjusted under 35 U.S.C. 154(b) by 762 days.

(21) Appl. No.: 12/154,004

(22) Filed: May 20, 2008

(65) Prior Publication Data

US 2009/0291696 A1   Nov. 26, 2009

(51) Int. Cl.
   *H04W 36/00* (2009.01)
(52) U.S. Cl. ......... 455/436; 455/437; 455/438; 455/439
(58) Field of Classification Search ........... 455/436–439
   See application file for complete search history.

(56) References Cited

U.S. PATENT DOCUMENTS

| | | | |
|---|---|---|---|
| 6,907,501 B2 | 6/2005 | Tariq et al. | |
| 7,801,530 B2 * | 9/2010 | Oswal et al. | 455/437 |
| 2003/0009535 A1 | 1/2003 | Apoltolppulos et al. | 709/219 |
| 2005/0132049 A1 | 6/2005 | Inoue et al. | 709/225 |
| 2005/0282546 A1 * | 12/2005 | Chang et al. | 455/436 |
| 2006/0227744 A1 * | 10/2006 | Metke et al. | 370/331 |
| 2008/0268907 A1 * | 10/2008 | Senarath et al. | 455/561 |

FOREIGN PATENT DOCUMENTS

| | | |
|---|---|---|
| JP | 09046753 | 2/1997 |
| JP | 2005-006043 A | 1/2005 |
| WO | 03005676 A1 | 1/2003 |

OTHER PUBLICATIONS

U.S. Appl. No. 11/819,970, filed Jun. 29, 2007, James W. McGowan, et al.
U.S. Appl. No. 11/819,969, filed Jun. 29, 2007, James W. McGowan, et al.
U.S. Appl. No. 11/811,326, filed Jun. 7, 2007, Thomas Janiszewski et al.
U.S. Appl. No. 11/614,398, filed Dec. 21, 2006, Mary S. Chan, et al.
U.S. Appl. No. 11/614,371, filed Dec. 21, 2006, Mary S. Chan, et al.
V. de Nitto Persone et al., "Modeling and Evaluation of Prefetching Policies for Context-Aware Information Services", Mobicom '98, Proceedings of the 4th Annual ACM/IEEE International Conference on Mobile Computing and Networking., Dallas, TX, Oct. 25-30, 1998, XP-000850256, pp. 55-64.
PCT International Search Report dated Aug. 5, 2009 (PCT/US2009/002378) 4 sheets.

* cited by examiner

Primary Examiner — Marisol Figueroa (57) ABSTRACT

A method and apparatus in which a mobile network advantageously communicates data requests to neighboring data stores so that they may pre-fetch the data. In particular, in accordance with an illustrative embodiment of the present invention, a protocol is advantageously established whereby a local data store in a mobile network notifies neighboring data stores of data requests, and whereby the neighboring data stores advantageously pre-fetch the data that may be required, thereby advantageously avoiding cascading cache misses. Such notifications may advantageously reduce the number of cache misses, which in turn may advantageously reduce the latency to download data as the user moves around within the mobile network and changes data sources. Specifically, in accordance with an illustrative embodiment of the present invention, a protocol for communicating data requests between local storage centers in a network supporting mobile users is provided.

22 Claims, 5 Drawing Sheets

METHOD AND APPARATUS FOR PRE-FETCHING DATA IN A MOBILE NETWORK ENVIRONMENT USING EDGE DATA STORAGE

FIELD OF THE INVENTION

The present invention relates generally to the field of mobile communications, and more particularly to a method and apparatus for optimizing data delivery in a mobile network environment.

BACKGROUND OF THE INVENTION

In mobile telecommunications networks (e.g., cellular telephone systems), users with mobile terminals are now, in addition to having telephonic voice conversations, able to receive multimedia data such as, for example, Internet web pages and downloaded videos. As such, the need to provide substantial data "content" to a user of a mobile device has developed. For these purposes and for reasons of efficiency, it has recently been recognized that it may be advantageous to provide local storage within the radio access network (RAN) portion of a mobile telecommunications network, rather than merely in the core network (CORE), in order to buffer or cache the data being downloaded. That is, for example, it may be advantageous to provide local caches at a mobile base station, in order to buffer the data being delivered to the mobile terminals which are communicating with the given base station.

However, given such an architecture having local caches within the RAN, consider the situation in which a user moves among these local data sources in a mobile network—that is, for example, consider when a mobile user moves from communicating with one mobile base station to another, in an architecture having local caches at the various base stations. When such a mobile user is making use of such a local data source and then moves from one base station to another, he or she loses access to the local data store that was being employed. Thus, the local data store at the new location (i.e., the base station with which the mobile device is now communicating) will need to freshly load the data that was being downloaded by the mobile—namely the data that had been stored in the memory store of the base station with which it was previously communicating.

Note that the communication path between the terminal and the data source can be divided into a local path and a global path. The local path is the portion of the pathway between the mobile terminal and the data source that changes when the user moves. For example, the local path may be the path between the user terminal and the mobile base station with which it is currently communicating.

Now consider as an example a user that requests data that happens not to be stored in the associated local storage cache. This "first" local cache will request the data from some other data store (e.g., a data store in the CORE network), resulting in a typical delay of one-half to several seconds. However, a quickly moving mobile user (e.g., one on a moving train) can change to a different local path as often as once every few seconds. When the user moves to such another, "second" local path, the data store supporting that second local path could suffer a cache miss as well, thereby requesting the same data, resulting in another delay. For large data requests that take several seconds to deliver to a local cache, the user may again move even before the second local store can begin serving data. Even for small data requests, the latency may effectively halve the throughput to the terminal, as both the local data store and the terminal wait for data.

In this scenario, as the user continues to move, each successive cache may suffer a miss, causing a cascade of misses. At a minimum, these cascading cache misses may result in increasingly long delays in delivering the data. In a worst-case scenario, if the user keeps moving and the data request is large enough, the user's download may permanently stall.

SUMMARY OF THE INVENTION

In accordance with the principles of the present invention, the above problems are addressed with use of a method and apparatus in which a wireless communications (i.e., mobile) network advantageously communicates data requests from a data store delivering content to a given mobile terminal to other neighboring data stores, so that those neighboring data stores may advantageously pre-fetch data which may, in the future, be required to be delivered to the mobile terminal (if the given mobile terminal happens to move into the neighboring data store's geographical area). As used herein, the term "pre-fetch" refers to the downloading of the data in advance of any need to deliver the data, and regardless of the fact that the data might never need to be delivered by the particular data store which has pre-fetched the data.

In particular, in accordance with an illustrative embodiment of the present invention, a protocol is advantageously established whereby a local data store in a mobile network notifies neighboring data stores of data requests, and whereby the neighboring data stores advantageously pre-fetch the data that may be required, thereby advantageously avoiding cascading cache misses. Such notifications may advantageously reduce the number of cache misses, which in turn may advantageously reduce the latency to download data as the user moves around within the mobile network and changes data sources. Specifically then, in accordance with an illustrative embodiment of the present invention, a protocol for communicating data requests between local storage centers in a network supporting mobile users is provided.

More specifically, one illustrative embodiment of the present invention provides a method for delivering content to a given mobile terminal in a wireless communications network, the wireless communications network comprising a plurality of data stores for providing local storage of said content to be delivered to one or more mobile terminals located in corresponding geographical areas associated therewith, the method performed at a given one of said data stores associated with a geographical area in which said given mobile terminal is currently located, the method comprising the steps of delivering at least a portion of said content to said given mobile terminal with use of said given one of said data stores, identifying one or more of said plurality of data stores as being geographical neighbors of said given one of said data stores, and transmitting a notification message to one or more of the data stores which have been identified as geographical neighbors of said given one of said data stores, said notification message indicating that said given mobile terminal is having said at least a portion of said content delivered thereto by said given one of said data stores, thereby enabling each of said data stores to which said notification message has been transmitted to pre-fetch at least a portion of said content in advance of and for use in a possible future delivery to said given mobile terminal.

In addition, another illustrative embodiment of the present invention provides a method for delivering content to a given mobile terminal in a wireless communications network, the wireless communications network comprising a plurality of data stores for providing local storage of said content to be delivered to one or more mobile terminals located in corresponding geographical areas associated therewith, a given one of said data stores associated with a geographical area in which said given mobile terminal is currently located, the method performed at another one of said data stores which has been identified as being a geographical neighbor to the given one of said data stores, the method comprising the steps of receiving a notification message from said given one of said data stores that said mobile terminal is having at least a portion of said content delivered thereto by said given one of said data stores, and pre-fetching from one or more network data sources, in response to said received notification message, at least a portion of said content into said other one of said data stores, in advance of and for use in a possible future delivery of at least a portion of said content to said given mobile terminal.

DETAILED DESCRIPTION OF THE PREFERRED EMBODIMENTS

Figure 1:
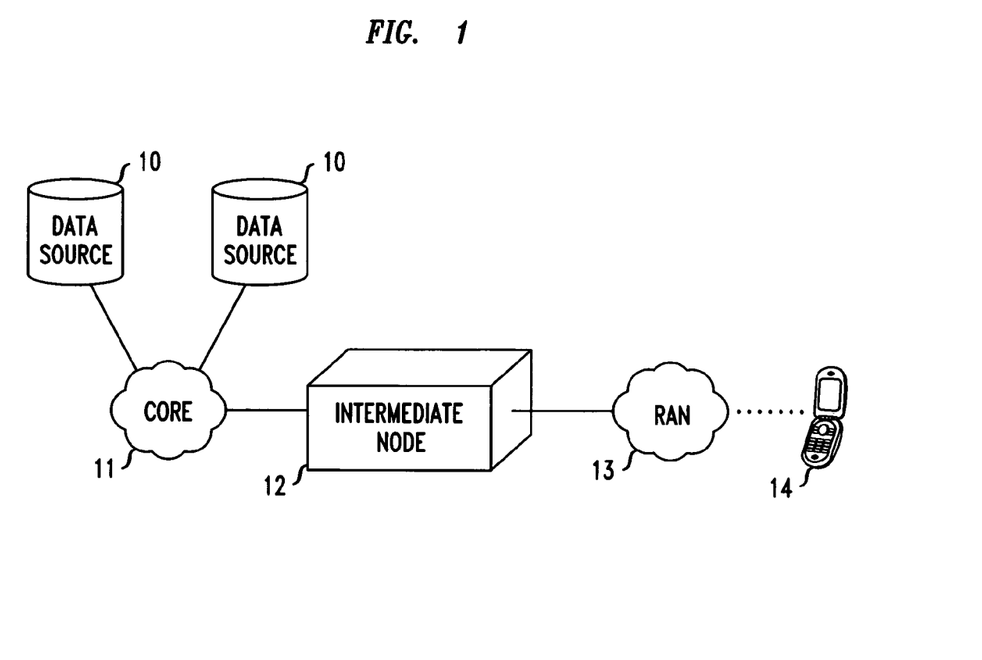
FIG. 1 shows an example of a typical hierarchical mobile communications network having data stores located in the CORE network.

In order to describe the various illustrative embodiments of the present invention, it is first advisable to describe both a conventional hierarchical mobile communications network and a more recently suggested "flatter" mobile communications network. First, FIG. 1 shows an example of a typical hierarchical mobile communications network having data stores located in the CORE network. In such existing hierarchical mobile networks, such as current state-of-the-art "1G" (first generation) through "3G" (third generation) commercial networks, the communication flow operates with an intermediate node, node 12, sitting between the radio access network, RAN 13, and the core network, CORE 11, as shown in FIG. 1. (Note that the intermediate node, node 12, may be a separate hardware component or may be a functional property designed into either the CORE 11 or the RAN 13.) The CORE 11 can route to the terminal 14 via intermediate node 12, which does not move. The CORE 11 communicates with the terminal 14 through this intermediate node 12, while the intermediate node advantageously knows where within the RAN 13 terminal 14 can be found. Since the Data Sources 10 in these networks sit on the CORE 11 side, the data connection between the Data Sources 10 and the terminal 14 are never broken. As the terminal 14 moves, only the routing within the RAN 10 needs to change. In other words, the data source is in a fixed location and does not move, even as the user moves.

Figure 2:
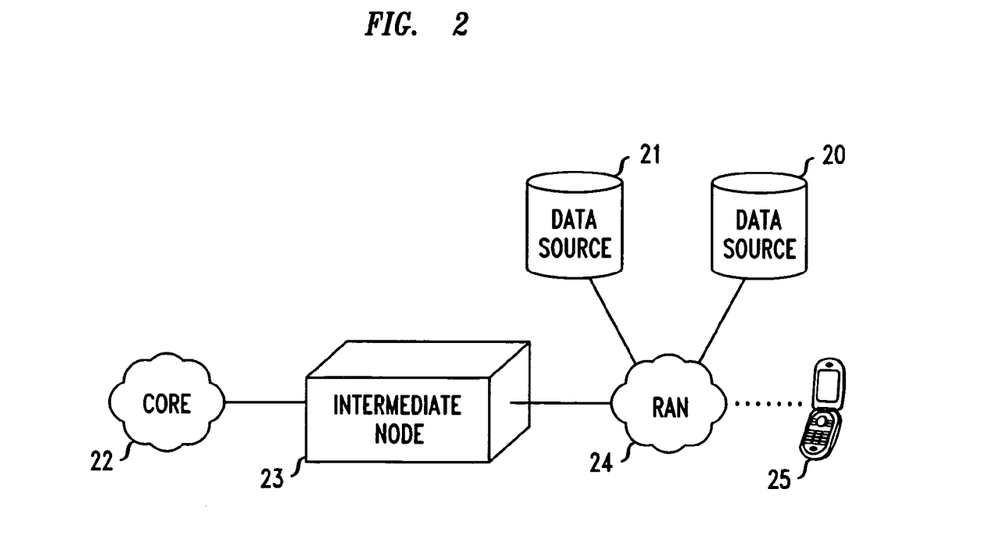
FIG. 2 shows an example of a "flatter" mobile communications network having local data storage which may advantageously employ various illustrative embodiments of the present invention.

On the other hand, FIG. 2 shows a an example of a more recently suggested "flatter" mobile communications network having local data storage which may advantageously employ various illustrative embodiments of the present invention. Such newer network architectures, such as those of "3GPP LTE" (Long Term Evolution) or those proposed for WiMAX, have a less hierarchical—that is, flatter—structure. In this flatter architecture, the data may be advantageously stored in Data Source 20 and/or Data Source 21, which are closer to the terminal 25. In particular, each of these data stores is advantageously storing a local copy of data intended for the terminal in, for example, a cache. When the terminal 25 moves from receiving data from Data Source 20 to receiving data from Data Source 21, the data being sent needs to be present in the new data source. From the perspective of the terminal, the source of the content is now mobile.

As pointed out above, the communication path between the terminal and the data source can be divided into a local path and global path. The local path is the portion of the pathway between the mobile terminal and the data source that changes when the user moves. In FIG. 1, the portions of the network from the RAN 13 to the terminal 14 are parts of the local path. The CORE 11 is part of the global path. The data sit in the CORE, and are therefore part of the global, unmoving path. No matter where the user moves, the data will be provided by the same data store.

However, the CORE is located deep within the network hierarchy, and there are both latency and bandwidth management benefits in keeping the data sources as close to the user as possible. To reap these benefits, caches have been planned that will exist in the RAN, and will therefore be in the local path, i.e., in the path that changes as the user moves. Data stored on the local path is said to be in local storage.

Note that the actual data source which is providing the data to the mobile terminal could be, for example, a server, a database, a local cache or a local buffer—namely, any network element for which there is a memory store of information intended for delivery to a mobile device. Therefore, as used herein, the term "data store" may include any and/or all of these data sources. Moreover, the data being requested by the mobile terminal may be a single file such as, for example, a video download or file attachment, a block of data from a database, or even a set of multiple files that form a webpage (since the large majority of web pages actually require many different files, downloaded separately). Therefore, as used herein, the terms "content", "data" or "data request" may include any and/or all of these situations.

Figure 3:
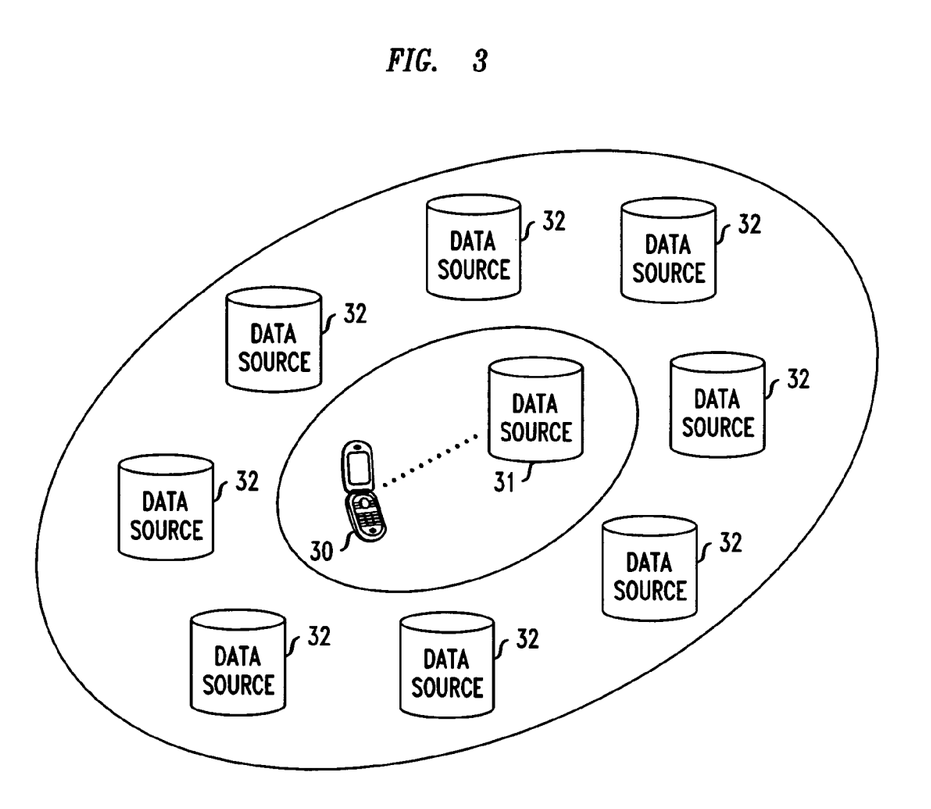
FIG. 3 shows an illustrative environment of a terminal being serviced by one of a plurality of local data sources in a mobile communications network such as that shown in FIG. 2, and in which various illustrative embodiments of the present invention may be advantageously employed.

FIG. 3 shows an illustrative environment of a terminal being serviced by one of a plurality of local data sources in a mobile communications network such as that shown in FIG. 2, and in which various illustrative embodiments of the present invention may be advantageously employed. Specifically, with respect to FIG. 3, a mobile terminal 30 requests data from a local data store 31. For convenience, we refer to the local data store 31 as a single network element that serves two distinct functions—storing data and relaying data to a mobile terminal. In various illustrative embodiments of the present invention, this local data store element may be two separate network elements, with a mobile terminal servicing node connecting to a plurality of storage devices, or a storage device connecting to a plurality of servicing nodes, or some kind of cluster with one or more servicing nodes and one or more local storage devices.

At some point in time the local data store is servicing a data request for terminal 30, but terminal 30 may then switch to any geographically "nearby" one of local data stores 32. If the content being delivered by data store 31 isn't available in the switched to data store 32, the data must be requested from another source, such as a centralized server or from data store 31. As noted above, this lag in requesting the content creates a poor user experience and puts a limit on the size of content that can be transferred if a user continues to move to new data stores. In accordance with various illustrative embodiments of the present invention, however, at the time the terminal 30 requests the data, the data store 31 advantageously notifies the geographically "neighboring" data stores 32 that the given content is being delivered, and may also provide some metadata thereto. In accordance with certain illustrative embodiments of the present invention, each of data stores 32 then may have the option of retrieving or pre-fetching this given content prior to their potential need for the data. That is, the surrounding data stores 32 may decide to download the content, based, for example, on such considerations as bandwidth, storage capacity, processor utilization, and/or a likely chance of receiving the terminal 30 in a handoff.

In accordance with certain illustrative embodiments of the present invention, the data store may advantageously hold the following pieces of information. Firstly, it may advantageously have knowledge of a unique identifier for each terminal. This could be handled, for example, at the application layer, illustratively by specifying the IP address of the terminal, or at a lower level, such as, for example, the EV-DO Universal Access Terminal Identifier (UATI), or any other unique identifier appropriate for the network, terminal and location of the data store. Secondly, the data store may advantageously have a table of its neighbors. This list of neighbors advantageously comprises all of the data stores that are likely to receive a terminal in a handoff. Note that although in accordance with one illustrative embodiment of the present invention, a single, immediately surrounding geographic torus-shaped ring (such as is illustratively shown in FIG. 3) around a mobile network base station may be used, in other illustrative embodiments of the present invention, a larger set of neighbors may be advantageously included, since a terminal may actually receive signals from a wider region. (Note that in accordance with illustrative embodiments of the present invention in which the data store is also the network element responsible for the hand-offs, it is likely to advantageously have this list already.) Optionally, in accordance with one illustrative embodiment of the present invention, a data store may advantageously hold a transition vector indicating the probability that the terminal will hand off to any particular neighbor. And in accordance with another illustrative embodiment of the present invention, a more sophisticated version of this concept may advantageously provide a data store with a matrix of handoff probabilities of terminals received from neighbor x that eventually pass to neighbor y (for each possible pair of data stores x and y).

In accordance with various illustrative embodiments of the present invention, various information that may be advantageously passed from a given one of said data stores to neighboring data stores (a "notification") may illustratively include:
1. A unique notification ID number.
2. The name or names of the data source being downloaded, which may, for example, comprise files (such as, for example, video clips) and/or generated content such as dynamic web pages.
3. An offset (e.g., a byte offset) into the data source being downloaded. This information advantageously enables neighboring data stores to not initiate the download from the beginning each time, thereby removing a possible limit on the size of files that can be retrieved, thereby helping to avoid the situation in which file portions already delivered in a series are downloaded to the local store after being delivered to the terminal.
4. The current data rate of the user. This information advantageously allows the neighboring data store to predict how far ahead to download, and the sensitivity of the terminal to the exact time of the handoff.
5. Total size of the data. Note that if a data request is nearly complete and the data rate is high, the data store may choose not to download. Moreover, in accordance with one illustrative embodiment of the present invention, a "flag" value can be placed in this field to indicate "infinite" content, such as, for example, a broadcast television source.
6. Time since the terminal has been handed to the current data store.
7. Transition probability that the terminal will move to a particular neighbor.
8. The unique identifier of the terminal, which may, for example, be used for security purposes.

Note that, in accordance with certain illustrative embodiments of the present invention, items 3 through 7 above advantageously allow the receiving data store to calculate a "weight" for the download, so that needed material may be advantageously prioritized among competing download requests, and cache misses may be advantageously avoided even for congested conditions. Among other things, in accordance with one of these illustrative embodiments of the present invention, item 7 advantageously allows the receiving data store to identify when multiple terminals are requesting a common piece of data, which thereby increases the probability that the data will ultimately be needed from the given one of said data stores.

In accordance with various illustrative embodiments of the present invention, the decision process used by a data store to notify its neighbors may be straightforward or may be made more complex to fit various scenarios. For example, in accordance with certain illustrative embodiments of the present invention, a data store may advantageously notify its neighbors when:
1. a terminal it is servicing requests a new data download;
2. a terminal is received in a hand off in the middle of a download; and/or
3. a triggering condition occurs, wherein the triggering condition may be based on the time since the last notification was sent and/or the likelihood that the terminal will hand off soon.

Note that, in accordance with various illustrative embodiments of the present invention, condition 3 may be advantageously "tuned" for any given network deployment. Such "tuning" adjustments will be obvious to those of ordinary skill in the art. For example, in accordance with one illustrative embodiment of the present invention, a re-notification weight r is advantageously calculated to be equal to an elapsed time t since the last notification was sent, multiplied by a probability that the terminal will move (i.e., hand off) in the next s seconds. Then, if r is greater than a predetermined threshold h, a re-notification may be advantageously made. Illustratively, h may be computed to be an historical average value of r in which hand-offs have actually occurred. The value for s may be advantageously calculated using historical data as well.

Figure 4:
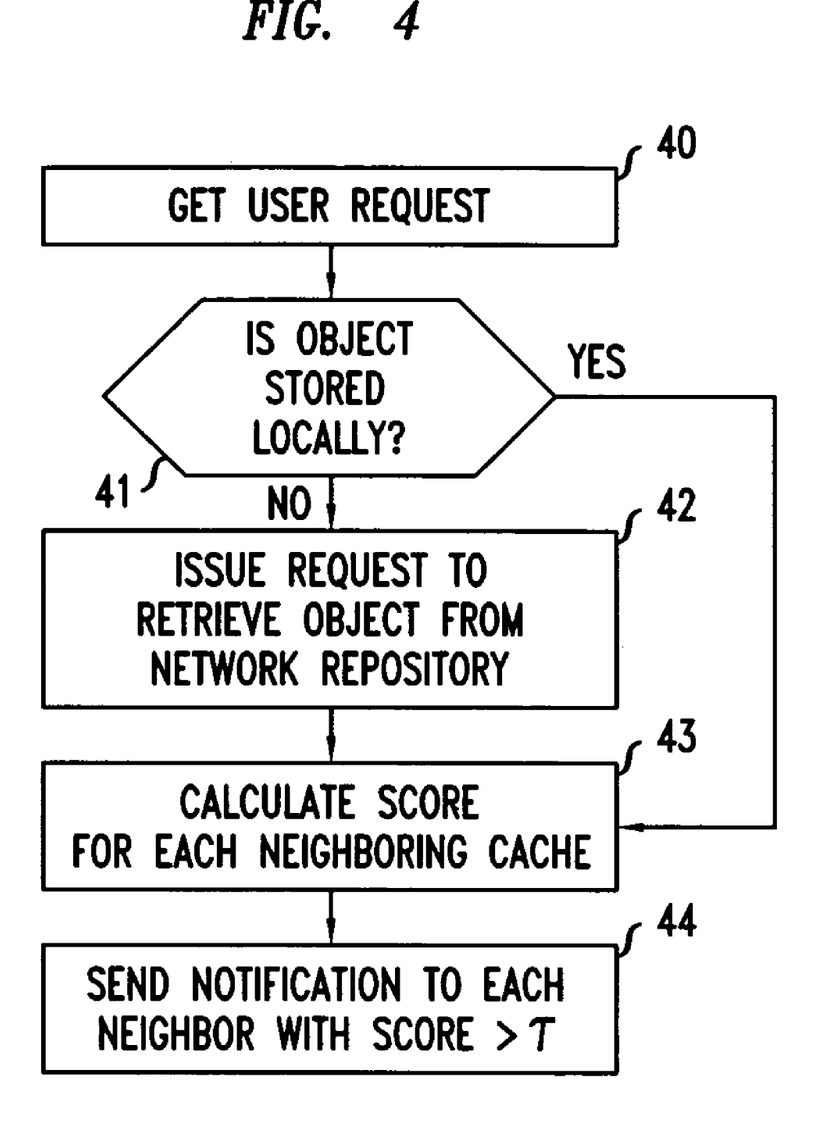
FIG. 4 shows a flowchart of an illustrative method for receiving user requests for data and sending notifications to neighboring data stores in accordance with an illustrative embodiment of the present invention.

FIG. 4 shows a flowchart of an illustrative method for receiving user requests for data and sending notifications to neighboring data stores in accordance with an illustrative embodiment of the present invention. First, in block 40, the data store receives a user request for data, illustratively either through a user terminal initiating a new request for data, or through a user terminal which is already in the processes of downloading data being handed off to a new data store. Block 41 determines if the requested/needed data (i.e., the object of the request) is already stored in the data store (i.e., the cache). If not, block 42 starts retrieving the data. (Assuming that there may be multiple cache misses, note that it is advantageous for the cache currently servicing the terminal to request data prior to notifying neighboring data stores. If all caches were to simultaneously request the missing data from the same source, resource contention could affect how quickly the data is available for the cache that requires the data most—namely the one currently servicing the terminal.)

If the requested/needed data is already in the data store, or, after block 42 has initiated the retrieval of the data, block 43 calculates a "notification" score for each neighboring cache. This score will advantageously determine the relative importance that a given neighboring cache (i.e., data store) be notified regarding the data being provided to the user terminal. In accordance with various illustrative embodiments of the present invention, the notification score may, for example, be based on the size (i.e., quantity) of the data left to be transferred, an estimate of the probability that the user will transfer to the given data store (which may, for example, itself rely on the history of data stores the terminal has transferred from), and/or other factors which will be obvious to those of ordinary skill in the art. Then, block 44 sends a notification to each neighbor with a score greater than some threshold $\tau$. For example, in accordance with one simple illustrative embodiment of the present invention, the score $\tau$ may be equal to the size of the data to be transferred divided by the current supported data rate to the terminal, and if the score is greater than $\tau=2$, the notification is then advantageously sent.

Figure 5:
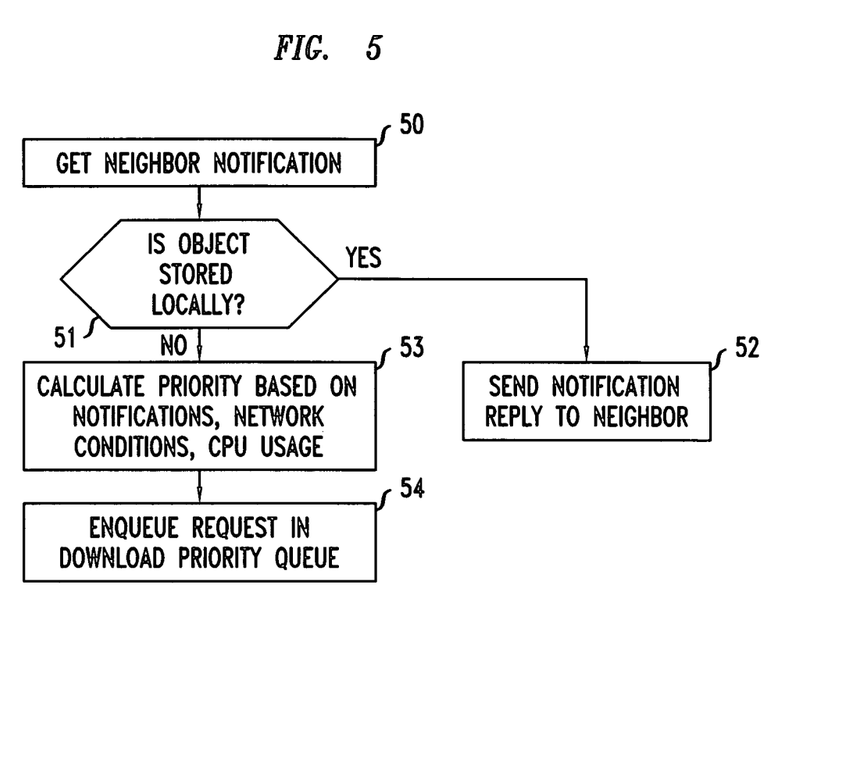
FIG. 5 shows a flowchart of an illustrative method for receiving and processing a notification received from a neighboring data store in accordance with an illustrative embodiment of the present invention.

FIG. 5 shows a flowchart of an illustrative method for receiving and processing a notification received from a neighboring data store in accordance with an illustrative embodiment of the present invention. First, a notification is received from a neighboring data store in Block 50. Block 51 then determines whether the requested data object is already stored locally, and will, therefore, not cause a cache miss if the terminal is handed off to the given data store. If the requested data object is already stored locally, block 52 sends a notification reply (described illustratively below) to the neighboring data store which sent the notification, and the process terminates. If, on the other hand, the requested data object is not stored locally, block 53 calculates a priority weight based on, for example, the number of notifications received, the size of the data required, and/or the availability of resources. (For example, in accordance with one simple illustrative embodiment of the present invention, the priority weight may be based solely on the size of the requested data divided by the time the request has been in the queue.) The request to store the data object is then placed in the download priority queue in block 54. As such, it can advantageously be acted upon (i.e., the download can be initiated) in accordance with its priority in the queue.

Figure 6:
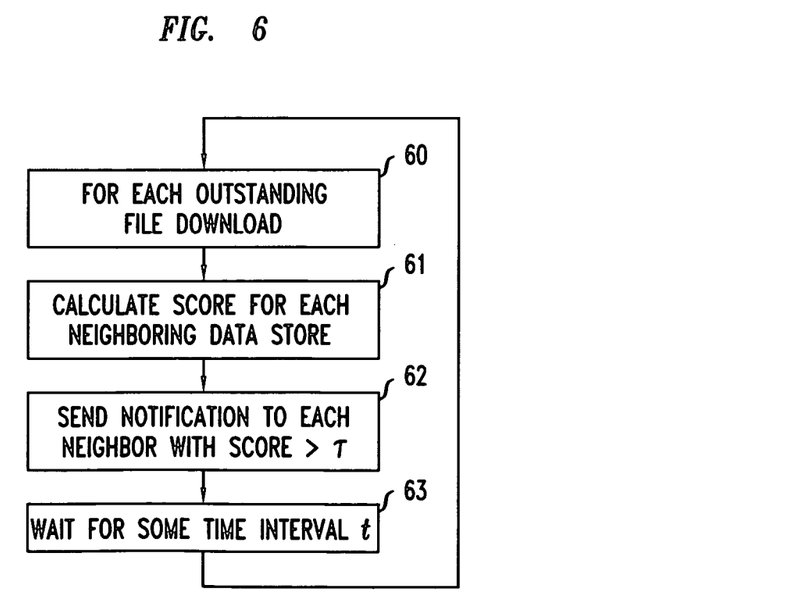
FIG. 6 shows a flowchart of an illustrative method for sending re-notifications to neighboring data stores in accordance with an illustrative embodiment of the present invention.

FIG. 6 shows a flowchart of an illustrative method for sending re-notifications to neighboring data stores in accordance with an illustrative embodiment of the present invention. In particular, in accordance with various illustrative embodiments of the present invention, a data source node may advantageously check for changing conditions and send re-notifications to its neighbors accordingly. First, Block 60 retrieves information about each data request being downloaded. Block 61 then calculates a notification score similar to the notification score calculated in Block 43 of the illustrative flowchart of FIG. 4. Illustratively, the primary difference between the notification score calculated in Block 61 of the illustrative flowchart of FIG. 6 with the one calculated in Block 43 of the illustrative flowchart of FIG. 4 is that the notification score calculated in Block 61 of FIG. 6 may advantageously be further based on the notification reply messages received from the neighboring nodes.

Next, Block 62 sends notifications to selected neighbors, taking into account the score calculated in Block 61. Block 63 then waits for a predetermined period of time t (illustratively 5 seconds), before returning the flow to block 60 for another iteration of the illustrative process. Note that, if at any time the entire data request has been satisfied, or if all neighbors have sent notification replies that indicate they already have the outstanding portion of the data request, no new notifications or re-notifications for the given data will be needed.

Note that the notification replies as described above may be used to serve at least two illustrative purposes. First, in accordance with one illustrative embodiment of the present invention, a notification reply may be advantageously used to stop the occurrence of unnecessary notifications and re-notifications from the illustrative process described by the flowchart of FIG. 6. Second, in accordance with another illustrative embodiment of the present invention, the notification request may be advantageously used to determine whether a data store currently suffering a cache miss can advantageously retrieve the needed content from a neighboring data store, rather than from a more centralized source.

In accordance with various illustrative embodiments of the present invention, the notification reply may contain one or more of the following fields:

1. The unique notification ID number from the notification message.
2. A range of already cached (or missing) data chunks. For example, the neighboring data store might indicate that it has, say, the first 1 megabyte of a 10 megabyte data request (or, equivalently, that it is missing the last 9 megabytes). Note that the neighboring data store may also indicate that it has the requested data completely, which, in accordance with one illustrative embodiment of the present invention, might be interpreted to mean that no re-notifications are to be sent (as per FIG. 6), since they are no longer needed. Also, the process in FIG. 6 may, in accordance with one illustrative embodiment of the present invention, for example, suppress all re-notifications until the terminal is getting near (but, preferably, not past) the point at which the neighbor has completed data.
3. An amount of time that the given neighbor is willing to store the requested data (before it is liable to be replaced with other data).
4. Estimates of the used and available bandwidth from the neighboring data store to the core network or to a central repository (e.g., a web proxy). (Note that in accordance with certain illustrative embodiments of the present invention, a data store may have a physical connection with a central repository, but it may also be able to reach the central repository through a core network.) These estimates illustratively indicate the amount of traffic being retrieved and/or the theoretical maximum amount of data retrieval still available. If the "pipe" is running at peak capacity, for example, the neighbor may indicate that no new downloads are possible.

5. Estimates of the used and available bandwidth on the mobile side. These estimates illustratively give an indication of limiting conditions on the air interface due to channel utilization, interference, etc., which may, in some cases, be a bottleneck to serving the needed content. As such, the neighbor may indicate that the requested download may not be deliverable to the terminal (i.e., it may not be able to serve the content to the terminal).

6. Estimates of computational power available for processing download requests. These estimates illustratively indicate how overloaded the neighbor is, in terms of required computational resources. Thus, if a neighbor's processor usage is too high, it may impact a download session and become a bottleneck to either retrieving or serving the needed content.

Overall, in accordance with certain illustrative embodiments of the present invention, the estimates described above give an indication of resource utilization in the neighboring nodes. As such, and based on this information, new re-notifications or new download requests can be sent or not sent over to various neighbors in accordance with certain illustrative embodiments of the present invention. As is also described above, these notification replies also may contain information about data already stored and the time interval that the data will be kept there. Such information may, in accordance with some illustrative embodiments of the present invention, be used by the notification node at a later time, either to alter notification scores (e.g., recognizing that it shouldn't notify neighboring nodes that already have the information) and/or to retrieve data requests directly from the neighbor in case the central repository is not responsive or the connection with the central repository is congested or not operational.

Figure 7:
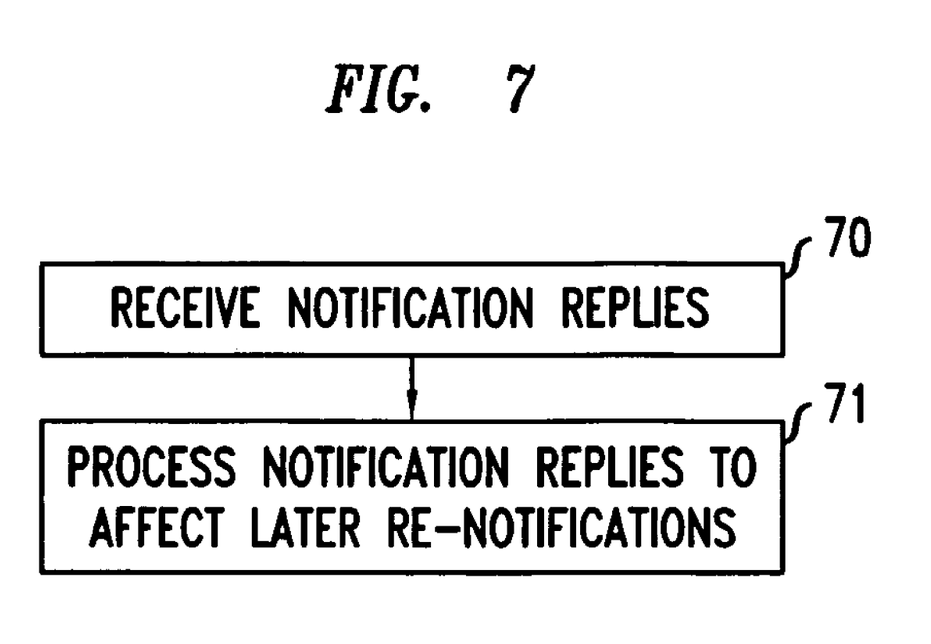
FIG. 7 shows a flowchart of an illustrative method for receiving and processing notification replies received from neighboring data stores in accordance with an illustrative embodiment of the present invention.

FIG. 7 shows a flowchart of an illustrative method for receiving and processing notification replies received from neighboring data stores in accordance with an illustrative embodiment of the present invention. In accordance with one illustrative embodiment of the present invention, notifications and re-notifications may be treated identically by the receiving node, and both will merit equivalent notification replies. First, Block 70 receives a notification reply, which may, for example, have been sent by a notified neighboring node in accordance with the illustrative flowchart of FIG. 5. For example, if the notified data store already has the requested item, it advantageously replies with a notification reply configured to prevent further unnecessary notifications. Block 71 processes the received notification replies which, in accordance with one illustrative embodiment of the present invention, may be advantageously used to update the re-notification weights such as those which are shown in the illustrative flowchart of FIG. 6.

ADDENDUM OF THE DETAILED DESCRIPTION

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

What is claimed is:

1. A method for delivering content to a given mobile terminal in a wireless communications network, the wireless communications network comprising a plurality of data stores for providing local storage of said content to be delivered to one or more mobile terminals located in corresponding geographical areas associated therewith, given one of said data stores associated with a geographical area in which said given mobile terminal is currently located, the method performed at another one of said data stores which has been identified as being a geographical neighbor to the given one of said data stores, the method comprising the steps of:

receiving a notification message from said given one of said data stores that said mobile terminal is having at least a portion of said content delivered thereto by said given one of said data stores;

wherein the notification message comprises
(i) an identification of the content being delivered to said given mobile terminal by said given one of said data stores, and
(ii) one or more offsets into the content being delivered to identify said at least a portion of said content being delivered to said given mobile terminal by said given one of said data stores; and determining whether to pre-fetch at least a portion of said content from one or more network data sources into said other one of said data stores in response to said received notification message, and in advance of and for use in a possible future delivery of at least a portion of said content to said given mobile terminal, wherein said determination of whether to pre-fetch said content is performed based on a transition matrix for indicating a probability of a hand off of a mobile terminal from one of said data stores to another one of said data stores and prioritizing at least a portion of said content, and wherein said one or more network data sources do not comprise said data stores for providing local storage of said content.

2. The method of claim 1 wherein each of the plurality of data stores is comprised in a corresponding one of a plurality of wireless base stations, and wherein the delivery of at least a portion of said content to said given mobile terminal by said given one of said data stores is performed by the wireless base station comprising said given one of said data stores.

3. The method of claim 1 wherein the notification message comprises one or more of: a unique notification ID number; one or more names of the one or more network data sources; one or more offsets into the one or more network data sources being downloaded into said given one of said data stores; a current data rate of said given mobile terminal; an indication of a total size of each of said one or more network data sources being downloaded into said given one of said data stores; a time since the given mobile terminal has been located in said geographical area associated with the given one of said data stores; a transition probability indicating a likelihood that the given mobile terminal will move into the geographical area associated with the other one of said data stores; and a unique ID of the given mobile terminal.

4. The method of claim 1 further comprising the step of transmitting a notification reply to said given one of said data stores.

5. The method of claim 4 wherein the notification reply comprises one or more of: a unique ID number which was received as part of the notification message; information indicative of portions of said content which have been already downloaded by the other one of said data stores; an amount of time for which the other one of said data stores is willing to store said at least a portion of said content which it has downloaded; estimates of used and available bandwidth for the other one of said data stores; and an estimate of available computational power for the other one of said data stores.

6. The method of claim 1 further comprising the step of receiving one or more re-notification messages from said given one of said data stores.

7. A method for delivering content to a given mobile terminal in a wireless communication network, the wireless communication network comprising a plurality of data stores for providing local storage of said content to be delivered to one or more mobile terminals located in corresponding geographical areas associated therewith, a given one of said data stores associated with a geographical area in which said given mobile terminal is currently located, the method performed at another one of said data stores which has been identified as being a geographical neighbor to the given one of said data stores, the method comprising the steps of:

receiving a notification message from said given one of said data stores that said mobile terminal is having at least a portion of said content delivered thereto by said given one of said data stores;

wherein the notification message comprises
  (i) an identification of the content being delivered to said given mobile terminal by said given one of said data stores, and
  (ii) one or more offsets into the content being delivered to identify said at least a portion of said content being delivered to said given mobile terminal by said given one of said data stores; and determining whether to pre-fetch at least a portion of said content from one or more network data sources into said other one of said data stores in response to said received notification message, and in advance of and for use in a possible future delivery of at least a portion of said content to said given mobile terminal, wherein said determination of whether to pre-fetch said content is performed based on a transition matrix for indicating a probability of a hand off of a mobile terminal from one of said data stores to another one of said data stores and prioritizing at least a portion of said content; and further comprising the step of calculating a priority value in response to said received notification message, and wherein the step of determining whether to pre-fetch at least a portion of said content into said other one of said data stores is performed based on said priority value.

8. The method of claim 7 wherein each of the plurality of data stores is comprised in a corresponding one of a plurality of wireless base stations, and wherein the delivery of at least a portion of said content to said given mobile terminal by said given one of said data stores is performed by the wireless base station comprising said given one of said data stores.

9. The method of claim 7 wherein the notification message comprises one or more of: a unique notification ID number; one or more names of the one or more network data sources; one or more offsets into the one or more network data sources being downloaded into said given one of said data stores; a current data rate of said given mobile terminal; an indication of a total size of each of said one or more network data sources being downloaded into said given one of said data stores; a time since the given mobile terminal has been located in said geographical area associated with the given one of said data stores; a transition probability indicating a likelihood that the given mobile terminal will move into the geographical area associated with the other one of said data stores; and a unique ID of the given mobile terminal.

10. The method of claim 7 further comprising the step of transmitting a notification reply to said given one of said data stores.

11. The method of claim 10 wherein the notification reply comprises one or more of: a unique ID number which was received as part of the notification message; information indicative of portions of said content which have been already downloaded by the other one of said data stores; an amount of time for which the other one of said data stores is willing to store said at least a portion of said content which it has downloaded; estimates of used and available bandwidth for the other one of said data stores; and an estimate of available computational power for the other one of said data stores.

12. The method of claim 7 further comprising the step of receiving one or more re-notification messages from said given one of said data stores.

13. A base station for use in delivering content to one or more mobile terminals in a wireless communications network, the base station comprising:

a processor; and a data store for providing local storage of said content to be delivered to one or more mobile terminals located in a geographical area associated with the base station, wherein the processor is operable to receive a notification message from another base station which is a geographical neighbor of the base station, said notification message indicating that a given mobile terminal is having at least a portion of said content delivered thereto by said other base station, wherein the processor is operable to determine whether to pre-fetch from one or more network data sources, in response to said received notification message, at least a portion of said content into the data store, in advance of and for use in a possible future delivery of at least a portion of said content to said given mobile terminal, wherein said one or more network data sources do not comprise data stores for providing local storage of said content, and wherein said determination of whether to pre-fetch is performed based on a transition matrix for indicating a probability of a hand off of a mobile terminal from one base station to another base station and prioritizing at least a portion of said content.

14. The base station of claim 13 wherein the notification message comprises one or more of: a unique notification ID number; one or more names of the one or more network data sources; one or more offsets into the one or more network data sources being downloaded into said given one of said data stores; a current data rate of said given mobile terminal; an indication of a total size of each of said one or more network data sources being downloaded into said given one of said data stores; a time since the given mobile terminal has been located in said geographical area associated with the given one or more data stores; a transition probability indicating a likelihood that the given mobile terminal will move into the geographical area associated with the other one of said data stores; and a unique ID of the given mobile terminal.

15. The base station of claim 13 further comprising a transmitter operable to transmit a notification reply to a said given one of said data stores.

16. The base station of claim 15 wherein the notification reply comprises one or more of: a unique ID number which was received as part of the notification message information indicative of portions of said content which have been already downloaded by the other one of said data stores; an amount of time for which the other one of said data stores is willing to store said at least a portion of said content which it has downloaded; estimates of used and available bandwidth for the other one of said data stores; and an estimate of available computational power for the other one of said data stores.

17. The base station of claim 13 further comprising a receiver operable to receive one or more re-notification messages from said given one of said data stores.

18. A base station for use in delivering content to one or more mobile terminals in a wireless communications network, the base station comprising:
   a processor; and
   a data store for providing local storage of said content to be delivered to one or more mobile terminals located in a geographical area associated with the base station,
   wherein the processor is operable to receive a notification message from another base station which is a geographical neighbor of the base station, said notification message indicating that a given mobile terminal is having at least a portion of said content delivered thereto by said other base station,
   wherein the notification message comprises
      (i) an identification of the content being delivered to said given mobile terminal by said other base station and
      (ii) one or more offsets into the content being delivered to identify said at least a portion of said content being delivered to said given mobile terminal by said other base station and
   wherein the processor is operable to determine whether to pre-fetch from one or more network data sources, in response to said received notification message, at least a portion of said content into the data store, in advance of and for use in a possible future delivery of at least a portion of said content to said given mobile terminal, wherein said determination of whether to pre-fetch is performed based on a transition matrix for indicating a probability of a hand off of a mobile terminal from one base station to another base station and prioritizing at least a portion of said content; and
   wherein the processor is further operable to calculate a priority value in response to said received notification message, and wherein the determination of whether to pre-fetch at least a portion of said content into said other one of said data stores is based on said priority value.

19. The base station of claim 18 wherein the notification message comprises one or more of: a unique notification ID number; one or more names of the one or more network data sources; one or more offsets into the one or more network data sources being downloaded into said given one of said data stores; a current data rate of said given mobile terminal; an indication of a total size of each of said one or more network data sources being downloaded into said given one of said data stores; a time since the given mobile terminal has been located in said geographical area associated with the given one or more data stores; a transition probability indicating a likelihood that the given mobile terminal will move into the geographical area associated with the other one of said data stores; and a unique ID of the given mobile terminal.

20. The base station of claim 18 further comprising a transmitter operable to transmit a notification reply to a said given one of said data stores.

21. The base station of claim 20 wherein the notification reply comprises one or more of: a unique ID number which was received as part of the notification message information indicative of portions of said content which have been already downloaded by the other one of said data stores; an amount of time for which the other one of said data stores is willing to store said at least a portion of said content which it has downloaded; estimates of used and available bandwidth for the other one of said data stores; and an estimate of available computational power for the other one of said data stores.

22. The base station of claim 18 further comprising a receiver operable to receive one or more re-notification messages from said given one of said data stores.

* * * * *